United States Patent Office 3,380,933
Patented Apr. 30, 1968

3,380,933
POROUS ALUMINA PRODUCTS AND METHOD
OF MANUFACTURE
Max Michel, Sarcelles-les-Rosiers, and Jacques Courbon,
Mess-des-Ingenieurs-a-Salindres, France, assignors to
Produits Chimiques Pechiney-Saint-Gobain, Neuilly-sur-Seine, France
No Drawing. Continuation-in-part of application Ser. No.
254,006, Jan. 25, 1963. This application Feb. 9, 1966,
Ser. No. 526,059
12 Claims. (Cl. 252—455)

ABSTRACT OF THE DISCLOSURE

Products, and a process for their production, comprising highly porous bodies including a substantial proportion of alumina and characterized by a porous volume greater than 20 cm³/100 grams and by having fine pores dimensioned between 0.1 and 5 microns. The process involves precipitating an alumina gel at a pH between 7.5 and 11, drying and washing the gel, removing water of hydration, shaping the gel, and finally sintering between 1500 and 1800° C.

Products can also be produced having distinct groups of pores comprising macropores dimensioned between 0.1 and 5 microns and micropores of less than 0.1 microns.

SPECIFICATION

This application is a continuation-in-part of applicants' copending application Ser. No. 254,006, and now abandoned, filed Jan. 25, 1963.

This invention relates to porous products rich in alumina and to a new and improved method for producing same. It relates more particularly to production of products rich in alumina having a porosity greater than 20 cm.³/100 grams of product and wherein the pores are uniformly distributed throughout the product and dimensioned to be within the range of 0.1 to 5 microns and preferably within the range of 0.5 to 2 microns in cross-section.

Porous products rich in alumina have heretofore been produced wherein the porosity is within the range of 10 to 20 cm.³/100 grams but, in such instances, the dimensions of the pores have been found to extend over a fairly wide range. Some alumina products have also been produced having a porosity as high as 50 cm.³/100 grams but this porosity is achieved, for the most part, by pores of large dimension, of wide variation and poor distribution, with some pores having a cross-section as great as 100 microns, depending somewhat upon the size of the solid alumina particles.

It is an object of this invention to provide a method for producing porous products rich in alumina wherein the pores are of fine dimension and of relatively uniform distribution. The method also provides for the production of products of the type described which include in addition to alumina, other refractory oxides such as thoria, beryllia, silica, and/or zirconia.

More specifically, it is an object of this invention to provide a method for producing a porous product rich in alumina or rich in alumina and other refractory oxides, which is characterized by a porosity greater than about 20 to 25 cm.³/100 grams and preferably greater than 60 cm.³/100 grams. The products are characterized by pores dimensioned to be less than 5 microns in cross-section and preferably within the narrow range of 0.1 to 5 microns, and more specifically within the exceedingly narrow range of 0.5 to 2 microns.

It is a related object of this invention to provide gel compositions for use in the preparation of said products wherein the gel compositions preferably include a double system of pores including one group of macropores within the range of 0.1 to 5 microns and another group of micropores of considerably smaller dimension down to 0.01 micron in cross-section.

As used herein, the term "product" is meant to include porous products rich in alumina wherein alumina constitutes the essential and major component but wherein the product may include other refractory oxides in addition to alumina, as represented by thoria, beryllia, silica and/or zirconia, in proportions not exceeding 50 parts by weight, and preferably not exceeding 25 parts by weight, of said other refractory oxides per 100 parts by weight alumina.

Briefly described, the products of this invention are secured by a process which makes use of the following procedural steps: preparation of a gel of alumina or of alumina and one or more of the other refractory oxides; mechanically drying and washing the gel; subjecting the dried and washed gel to a mechanical and/or thermal treatment which treatment eliminates at least partially the water or hydration content of said gel; eventually shaping the gel, and finally sintering the treated gel.

The foregoing process can be modified by preceding the mechanical and thermal treating step with an aging step carried out for a period of time depending upon the character of the final product that is desired.

The preparation of the alumina gel or the mixed gel of alumina and other refractory oxides can be carried out in accordance with the process described in the French Patent No. 1,250,000, dated Nov. 27, 1959. For example, when it is desired to prepare an alumina gel having a part of its pores distributed in a continuous manner and wherein all said part of its pores are dimensioned to lie within the range of 0.1 to 5 microns, an alumina gel is precipitated at a pH between 7.5 and 11 from an aqueous solution of alkali aluminate or of an aluminum salt at a temperature between 20–40° C. The concentration of aluminum ion is selected so that the suspension of the alumina gel will contain 40–80 grams of alumina, expressed at $Al_2O_3$, per liter of suspension.

In one embodiment, the precipitated gel is aged for one hour at 20–30° C., either in its precipitation medium, or at a slightly lower pH but still above a pH of 7. The precipitate is dried by mechanical means such as a centrifuge, and then washed. It is then subjected to a preliminary drying at a temperature of about 110° C. for a sufficient length of time, such as from two to ten hours, to enable shaping, as by extrusion. A suitable consistency may be described as a cake containing, for example, about 65 percent by weight or more of water.

By way of a variation, following aging for at least fifteen hours but not more than forty-eight hours at 20–30° C., centrifugal drying and washing, as above described, the product is subjected to a mechanical treatment such as kneading or rolling. A dry gel is obtained having a total porosity which can exceed 100 cm.³/100 grams and which can be shaped after a preliminary drying step of the type previously described, and then finally dried.

In another embodiment, the mechanically dried and washed gel precipitate can be submitted directly to the preliminary drying step at a temperature of 110° C. or more to produce a product containing about 65 percent by weight or more of water. Thereafter, it can be shaped and heat dried so as to reduce the water content to approximately 20–30 percent by weight or less. This latter embodiment can be varied by treating the gel that has been mechanically dried and washed after precipitation thermally to dry the product followed by crushing to smaller pieces.

A porous product rich in alumina can be prepared, in accordance with the practice of this invention, wherein the gel employed is characterized by a pore system distributed in a discontinuous manner, as in the formation of two or more separate groups of pores, including a first group of macropores having an average cross-section within the range of 0.1 to 5 microns and which forms approximately one-half to two-thirds of the total porosity, and another group of micropores having an average cross-section dimensioned to be considerably smaller than the first group down to an average of about 0.01 micron. For this purpose, the precipitation is carried out as previously described or as in the aforementioned French patent but the aging is prolonged for at least fifteen hours at ambient temperature and the mechanical treatment, such as kneading or rolling, is omitted.

The average cross-sectional dimension or diameter of the macropores in this gel is somewhat proportional to the time of aging. For best results, it is desirable to make use of an aging time within the range of fifteen to forty-eight hours. The prolonged evolution of the suspension in the course of aging is important. Apart from the fact that it is conducive to the formation of a cake of particular texture after mechanical drying, as by means of a centrifuge or a filter press, and washing, prolonged evolution of the suspension in the course of the aging process leads to a consistency wherein the material can be shaped directly or else held without the need for preliminary heat drying.

The alumina cake that is formed contains 15–20 percent by weight $Al_2O_3$ and is easily reduced to a finely divided state. The formed cake, after its eventual shaping, is dried slowly in a suitable oven. Uncracked solid particles having good mechanical strength will be obtained.

The alumina gel prepared in accordance with the practice of this invention, as previously described, is submitted to a sintering step at a temperature below 1800° C. and preferably at a temperature within the range of 1500–1700° C.

The characteristics of the final sintered product can be predetermined by proper selection of the starting gel, by the rate of temperature rise for the sintering operation, and by the length of time of sintering.

It has been found that when an alumina gel having a continuous distribution of pores is submitted to sintering, the product obtained will have a total volume of porosity less than that of a product obtained from a gel having a discontinuous or double distribution of pores even though the gels originally or before sintering had the same total volume of porosity, thus, the greater interest in the latter system.

It has been found further that if the raw products having double distribution of pores are sintered at temperatures just sufficient to effect disappearance of the micropores, such as at a temperature of at least 1500° C., little if any reduction occurs in the macroporous volume. Instead, the range of the cross-sectional dimensions or diameters of the macropores narrow to around an average value which is very close to or slightly higher than that which characterized the raw product.

It has also been established that the total porous volume of the sintered product will be substantially the same whether the temperature is raised to sintering temperature at a slow rate or by increments over a shorter length of time. However, a distribution of pores within a narrower dimensional range is favored by a slow rate of rise in temperature when compared with the increase in temperature at a more rapid rate to the desired sintering temperature.

The porous alumina product produced in accordance with the practice of this invention has many uses. It can be used in the fabrication of an insulating refractory lining; as an inert vehicle for reagents absorbed by the porous product, especially at high temperatures; as a solid bed in chromatography; and as a support for a catalyst. When used as a support for catalysts, the high porosity provides for easy access of the reagents or reactants to the catalytic system thereby to favor uniformity in activity throughout the catalytic mass.

The various methods heretofore described for the practice of this invention in the preparation of a porous alumina gel are schematically set forth in the following Table I. Given are the distribution of the pores (CD=continuous distribution) (DD=double distribution) after shaping. The total porous volume of the product secured is given in terms of cm.³/100 grams of product having a low percentage of water (less than 5 percent by weight), as measured by penetration of mercury under pressure in accordance with known test procedures. The samples were obtained by calcination of the gel at 400° C. The calcination was carried out for the purpose of making the gels prepared by the different methods comparable since the calcination has little, if any, effect on the dimensions of the pores or their distribution, especially with reference to pores larger than 0.01 micron.

TABLE 1

| Method of Preparation | Appearance | Type of Distribution | Total porous volume (cm³/100 g of product) |
|---|---|---|---|
| Aging (15 to 48 h) → Mechanical drying, washing → Drying | Pieces | DD | 70 – 105 |
| Aging (15 to 48 h) → Mechanical drying, washing → Shaping → Drying | Extruded | DD | 70 – 100 |
| Aging (15 to 48 h) → Mechanical drying, washing → Preliminary heat drying → Shaping → Drying | Extruded | DD | 70 – 100 |
| Rolling or kneading → Drying | Pieces | CD | 70 – 90 |
| Rolling or kneading → Preliminary heat drying → Shaping → Drying | Extruded | CD | 70 – 90 |
| P*Aging (1 h) → Mechanical drying, washing → Preliminary heat drying → Shaping → Drying | Extruded | CD | 70 – 90 |
| Mechanical drying, washing → Preliminary heat drying → Shaping → Drying | Extruded | CD | 40 – 60 |
| Mechanical drying, washing → Drying | Pieces | CD | 50 – 70 | p* Gel precipitation according to the French patent No. 1,250,000 dated November 27th, 1959.

The following examples, the results of which are summarized in Table II, are given by way of illustration, but not by way of limitation, of the various aspects of the present invention:

EXAMPLE 1

A suspension of alumina gel having 50 grams per liter of $Al_2O_3$ is precipitated from a solution of sodium aluminate by means of nitric acid at a temperature of approximately 30° C. and at a precipitation pH of 8.5.

The suspension is left to age at approximately 30° C. for about 15 hours. The suspension is then dried by centrifuge. The gel cake is washed on the centrifugal dryer to reduce the soda content to less than 150 parts per million, expressed as $Na_2O$ in the alumina.

After centrifugal drying, the gel cake is reduced to particles of a few millimeters and then slowly dried in a drying oven at 100° C. until constant weight is obtained. Then the material is raised in temperature at a rate to reach sintering temperature of 1650° C. in about one hour and it is held at sintering temperature for about one hour.

EXAMPLE 2

An alumina gel is prepared in the same manner as in Example 1. The aging time is increased to 20 hours at 30° C. The gel cake obtained is washed and dried under the same conditions as in Example 1. The product is heated at a rate to reach sintering temperature of 1600° C. in approximately one hour and then it is held at this sintering temperature of 1600° C. for one hour.

The average diameter of the pores in the product obtained is slightly higher than that which characterizes the raw product.

EXAMPLE 3

The preparation of the gel as well as the washing and drying steps are the same as in Example 2. The product is also sintered at 1600° C. but the rate of heat is changed to take two and one-half hours to reach sintering temperature.

The sintered product has a pore distribution which is much narrower than that of Example 2.

EXAMPLE 4

The procedure is the same as that of Example 2 except that the sintering temperature is 1650° C., the temperature of which is reached in approximately one hour and is maintained for approximately one hour. Under these sintering conditions, the average diameter of the pores does not change materially by comparison with the sintered product of Example 2 but the total porous volume is reduced.

EXAMPLE 5

Precipitation of alumina gel is carried out in a manner similar to that of Example 2. The cake is dried by centrifuge while still wet. It is rolled by passing between metal cylinders turning in opposite directions about parallel axes. One of the cylinders is perforated with openings of 3 mm. in diameter through which the gel is drawn. A product is obtained having a continuous distribution of pores of between 0.01 micron and 3 microns.

The alumina is sintered at 1700° C. for two hours after being heated up to sintering temperature in approximately one hour.

EXAMPLE 6

An alumina gel is prepared as in Example 5 except that the product is sintered for one hour at 1600° C. after being heated up to this temperature in approximately one hour. The sintered product has a higher porous volume by comparison with the product of Example 5 but the pore size is distributed over a wider range.

EXAMPLE 7

A continuous mixed gel of alumina and silica is precipitated by adding sodium silicate in solution to a solution of sodium aluminate and in an amount to obtain a gel having 12 percent by weight silica. The suspension is aged for one hour at 20–30° C. The gel is dried by centrifuge, washed and reduced in particle size as in Example 1. Thereafter it is dried at 100° C. to constant weight. The product is sintered at 1600° C. for one hour after being heated to this temperature in approximately one hour.

EXAMPLE 8

The procedure of Example 7 is followed to the drying of the product at 100° C. Thereafter, the product is sintered at 1500° C. for one hour after being heated to reach this temperature in approximately three hours.

When the silica-alumina product of Example 8 is compared with the product of Example 7, the same remarks can be made as for the comparison between Examples 6 and 5 respectively.

The system of the instant invention is designed to achieve sintered products wherein all or substantially all of the pores are dimensioned within the range of 0.1 to 5 microns and preferably within the range of 0.5 to 2 microns in cross section. Measurements undertaken indicate that 100 percent of the pores are within this size range in many instances, and a minimum of 90 percent is always achieved.

In the following Table 2, the results of measurements undertaken to determine the distribution of pores in the gels and products of the foregoing examples are summarized. The porous volumes are expressed in cm.³/100 grams of $Al_2O_3$ and the values set forth are those of the pores having a diameter above the value expressed in microns at the top of each column:

TABLE 2

(1) GELS

| Examples | For pores having a diameter higher than — | | | | | | | A | B |
|---|---|---|---|---|---|---|---|---|---|
| | 3µ | 2µ | 1.5µ | 1µ | 0.75µ | 0.5µ | 0.15µ | | |
| | The cumulative volumes in cm.³/100 g. of product are— | | | | | | | | |
| 1 | 0 | 1 | 5 | 44 | 54 | 58 | 66 | 105 | 1.3 |
| 2 | 0 | 14 | 20 | 41 | 48 | 52 | 59 | 90 | 1.5 |
| 3 | 0 | 14 | 20 | 41 | 48 | 52 | 59 | 90 | 1.5 |
| 4 | 0 | 14 | 20 | 41 | 48 | 52 | 59 | 99 | 1.5 |
| 5 | 0 | 1 | 2 | 8 | 12 | 17 | 25 | 87 | ----- |
| 6 | 0 | 1 | 2 | 8 | 12 | 17 | 25 | 87 | ----- |
| 7 | 1 | 3 | 4 | 6 | 7 | 9 | 18 | 80 | ----- |
| 8 | 1 | 3 | 4 | 6 | 7 | 9 | 18 | 80 | ----- |

(2) SINTERED PRODUCTS

| Ex. | For pores having a diameter higher than— | | | | | | | A | B | Sintering conditions |
|---|---|---|---|---|---|---|---|---|---|---|
| | 3µ | 2µ | 1.5µ | 1µ | 0.75µ | 0.5µ | 0.15µ | | | |
| | The cumulative volumes in cm.³/100 g. of product are— | | | | | | | | | |
| 1 | 0 | 4 | 13 | 34 | 39 | 39 | 40 | 40 | 1.5 | 1 h. at 1,650° C. |
| 2 | 1 | 8 | 28 | 41 | 45 | 48 | 52 | 52 | 1.8 | 1 h. at 1,600° C. |
| 3 | 1 | 8 | 35 | 47 | 50 | 50 | 52 | 52 | 1.9 | 1 h. at 1,600° C. slow rise. |
| 4 | 1 | 14 | 30 | 37 | 39 | 40 | 42 | 42 | 1.9 | 1 h. at 1,650° C. |
| 5 | 2 | 3 | 5 | 20 | 23 | 23 | 23 | 23 | 1.3 | 2 h. at 1,700° C. |
| 6 | 2 | 4 | 7 | 26 | 27 | 27 | 28 | 28 | 1.2 | 1 h. at 1,600° C. |
| 7 | 1 | 2 | 2 | 3 | 5 | 8 | 40 | 40 | 0.3 | 1 h. at 1,600° C. |
| 8 | 1 | 2 | 3 | 5 | 8 | 14 | 44 | 47 | 0.3 | 1 h. at 1,500° C. slow rise. |

A=Total porous volume in cm.³/100 g.
B=Average diameter of the pores in µ (microns).

It will be apparent from the foregoing that we have provided a new and improved porous alumina product or a porous product of alumina and other refractory oxides and a new and improved method for the preparation of same. It will be understood that changes may be made in the details of formulation, and conditions of operation, without departing from the spirit of the invention, especially as defined in the following claims.

That which is claimed is:

1. A process for the production of a highly porous product high in a compound of alumina, characterized by a total porous volume greater than 20 cm.³/100 grams and having substantially all pores dimensioned within the range of 0.1 to 5 microns comprising producing an aqueous solution of an aluminum compound, precipitating an alumina gel from the solution at a pH within the range of 7.5 to 11, mechanically drying and washing the gel, removing at least a part of the water of hydration from the gel, shaping the treated gel and then sintering the shaped product at a temperature between 1500° C. and 1800° C.

2. A process in accordance with claim 1 wherein at least 90 percent of said pores are dimensioned between 0.1 and 5 microns.

3. The process as claimed in claim 1 which includes the additional step of aging the gel prior to mechanical drying and washing to produce a gel having one group of macro pores dimensioned within the range of 0.1 to 5 microns and another group of micro pores of less than 0.1 micron.

4. A process in accordance with claim 3 wherein said group of macro pores forms one-half to two-thirds of the total porosity of the gel.

5. The process as claimed in claim 1 which includes the step of aging the gel prior to the mechanical drying and washing step.

6. The process as claimed in claim 1 which includes the step of preliminary drying of the gel after the mechanical drying and washing, and before the eventual shaping and the sintering steps.

7. The process as claimed in claim 1 in which the material after the mechanical drying and washing step is worked by one of the means of kneading and rolling.

8. The process as claimed in claim 1 in which, after the precipitation step, the gel is aged for from fifteen to forty-eight hours to produce a material having two porous systems, one system comprising macro pores and another system comprising micropores.

9. Porous aluminous products formed by sintering a precipitated alumina gel, said products comprising a member selected from the group consisting of alumina and combinations of alumina along with at least one refractory oxide present in an amount up to 50 parts by weight per 100 parts by weight of said alumina, the refractory oxide being selected from the group consisting of thoria, beryllia, silica, zirconia and mixtures thereof, said porous product having a total porous volume greater than 20 cm.³/100 grams and being characterized by very fine pores substantially all of which are dimensioned within the range of 0.1 to 5 microns.

10. A porous product as claimed in claim 9 in which the porous volume is greater than 60 cm.³/100 grams.

11. A porous product as claimed in claim 9 wherein said pores are dimensioned within the range of 0.5 to two microns.

12. A porous product as claimed in claim 9 wherein at least 90 percent of said pores are dimensioned within said range.

References Cited
UNITED STATES PATENTS

| | | | |
|---|---|---|---|
| 2,406,420 | 8/1946 | Weiser et al. | 252—463 |
| 2,644,799 | 7/1953 | Robinson | 252—455 |
| 2,773,842 | 12/1956 | Kimberlin et al. | 252—455 |
| 2,782,144 | 2/1957 | Pardee | 252—455 X |
| 2,982,719 | 5/1961 | Gilbert et al. | 252—463 |
| 3,172,866 | 3/1965 | Belon | 252—463 |
| 3,255,027 | 6/1966 | Talsma | 106—65 |

OTHER REFERENCES

Alumina Properties, by Allen S. Russell, ALCOA, Pittsburgh, Pa. (1953) pp. 17–19, copy in 23–141.

DANIEL E. WYMAN, *Primary Examiner.*

C. F. DEES, *Assistant Examiner.*

UNITED STATES PATENT OFFICE
CERTIFICATE OF CORRECTION

Patent No. 3,380,933　　　　　　　　Dated April 30, 1968

Inventor(s)　Max Michel et al.

It is certified that error appears in the above-identified patent and that said Letters Patent are hereby corrected as shown below:

In the heading to the printed specification, after line 8, insert -- Claim priority application France, Jan. 30, 1962, PV 886,358 --.

Signed and sealed this 7th day of December 1971.

(SEAL)
Attest:

EDWARD M. FLETCHER, JR.　　　　　　ROBERT GOTTSCHALK
Attesting Officer　　　　　　　　　Acting Commissioner of Patents